Dec. 31, 1935.     T. E. DAVIS     2,025,851
LIQUID DISPENSING FAUCET
Filed Oct. 10, 1934
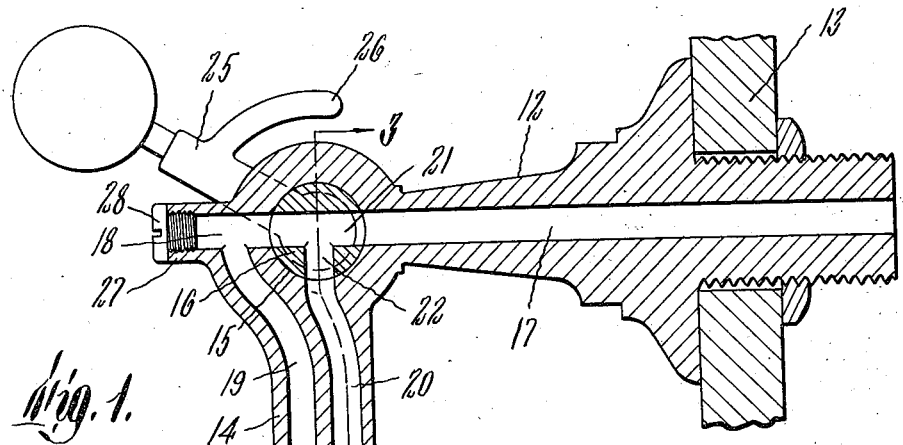
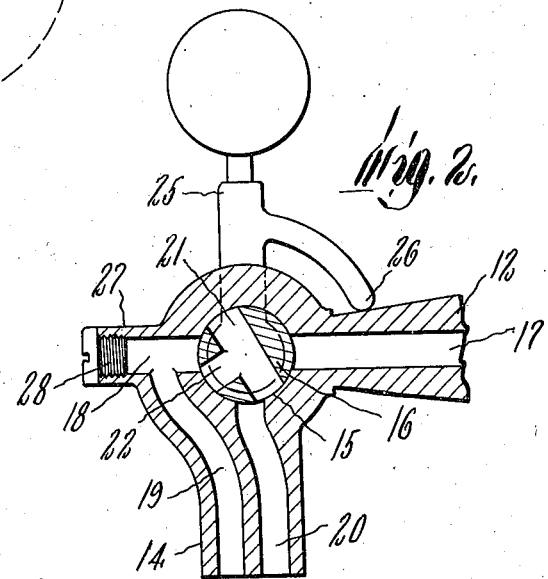
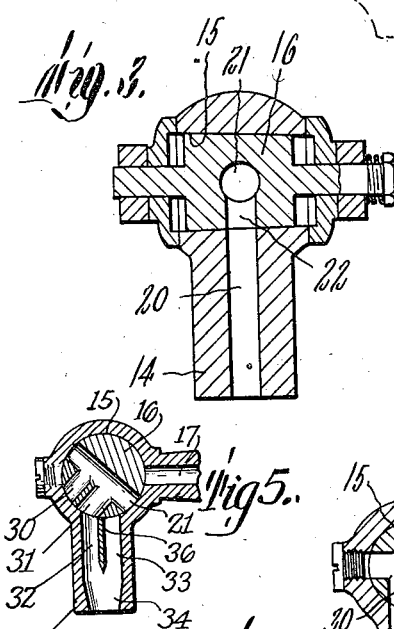
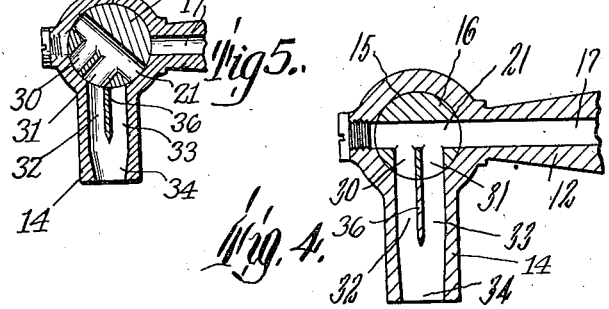

Patented Dec. 31, 1935

2,025,851

UNITED STATES PATENT OFFICE 2,025,851

LIQUID DISPENSING FAUCET

Thomas E. Davis, Arlington, Mass., assignor to Joseph A. Legasse, Boston, Mass.

Application October 10, 1934, Serial No. 747,672

4 Claims. (Cl. 225—5)

The chief object of this invention is to provide a faucet adapted to dispense foam generating liquid, such as beer, and to reduce the velocity and pressure of such liquid in its passage from a container wherein it is stored under pressure, to a contracted or small receptacle such as a beer glass, and thereby regulate the generation of foam to prevent excessive foaming in the receptacle, and also prevent excessive agitation of the liquid in the receptacle liable to cause spattering of the liquid.

Of the accompanying drawing forming a part of this specification,—

Figure 1 is a longitudinal section of a faucet embodying the invention, showing the valve open.

Figure 2 is a view similar to a portion of Figure 1, showing the valve closed.

Figure 3 is a section on line 3—3 of Figure 1.

Figure 4 is a view similar to a portion of Figure 1, showing a different embodiment of the invention.

Figure 5 is a view similar to Figure 4 showing the valve closed.

The same reference characters indicate the same parts in all of the figures.

In the preferred embodiment of the invention shown by Figures 1, 2 and 3, 12 designates a draft arm attachable to a container 13 such as a beer cask, in which liquid is confined under pressure.

The draft arm has an outlet branch 14 and a single hollow plug valve 16 fitted to turn in said seat. The draft arm has a longitudinal duct 17 communicating with one side of the valve seat, and adapted to communicate with the container 13. Said draft arm and outlet branch constitute an angular body, and the outlet end of the outlet branch is contracted so that its dispensing ducts are adapted to discharge simultaneously into a receptacle of limited capacity such as a beer glass 24. The angular body is provided with an angular outer dispensing duct composed of a short portion 18 aligned with the longitudinal duct 17 and communicating with the valve seat, and a longer portion 19 extending from the shorter portion into the inlet branch. The angular body is also provided with an inner dispensing duct 20 communicating with the valve seat 15, and extending directly therefrom into the outlet branch.

The valve 16 is provided with a connecting duct 21 arranged to connect the duct 17 with the dispensing duct portion 18 when the valve is in its opened position, and with a branch duct 22 communicating with the connecting duct 21 and arranged to connect said connecting duct with the inner dispensing duct 20 when the valve is open.

The dispensing ducts have an aggregate conducting capacity greater than that of the longitudinal duct 17 and the valve duct 21. The longitudinal duct 17 and the connecting duct 21 are each preferably about three eighths of an inch in diameter, and the dispensing duct 20 and duct portion 19 are each preferably about one-fourth of an inch in diameter. The shorter portion 18 of the angular dispensing duct may be of the same diameter as the longitudinal duct 17. I am not limited, however, to these proportions. The branch duct 22 of the valve may be of the same diameter as the inner dispensing duct 20.

It will now be seen that when the valve is open, as shown by Figure 1, the velocity and pressure of the streams emitted by the dispensing ducts are so reduced that excessive foaming of a foam generating liquid dispensed thereby into a receptacle 24, is prevented, only a desirable generation of foam being permitted, and that excessive agitation of the liquid dispensed into the receptacle, liable to cause spattering of the liquid, is also prevented.

The valve 16 is provided with a handle 25 which may be of any suitable construction, and provided with a stop 26 adapted to arrest the closing movement of the valve when it reaches the closed position shown by Figure 2.

The angular duct portion 18 is provided with an extension 27 preferably internally screw threaded, and with a closure which is preferably a headed screw 28 separably engaged with said extension. When said closure is removed the duct portions 18, 21 and 17 may be conveniently cleaned. The dispensing ducts 19 and 20, and the branch duct 22, may also be conveniently cleaned when the valve is in its opened position.

In the above described embodiment of the invention the means for establishing communication between the draft arm duct 17 and the dispensing ducts is provided by the valve, the valve seat and the duct 18.

Figure 4 shows a somewhat different embodiment of the invention in which the valve is provided with two branch ducts 30 and 31, arranged to communicate respectively with dispensing ducts 32 and 33 in the branch 14. In this embodiment the means for establishing communication between the draft arm duct and the dispensing ducts is provided wholly by the valve seat and valve. The dispensing ducts 32 and 33 are shorter than the outlet branch, and discharge through a single terminal duct extension 34, whose conducting capacity is not less than the aggregate capacity of the ducts 32 and 33, said extension extending to the outer end of the outlet branch, and delivering a single compact stream to a receptacle. In this embodiment the adjacent sides of the ducts 32 and 33 are formed by a partition 36 in the outlet branch 14.

I claim:

1. A faucet comprising an angular body including a draft arm attachable to a liquid container and having a longitudinal duct adapted to communicate with the container, a single hollow valve seat communicating with said duct, and an outlet branch, the draft arm and branch being provided with a plurality of dispensing ducts communicating with different portions of the valve seat; and a single plug valve fitted to turn in said seat and having connecting ducts formed and arranged to connect the longitudinal duct with each of the dispensing ducts when the valve is in its open position, and to permit the closing of the longitudinal duct by the valve, the dispensing ducts being so close to each other in the outlet branch, that they are adapted to discharge simultaneously into a contracted receptacle, the aggregate conducting capacity of the dispensing ducts being greater than the conducting capacity of the longitudinal duct, whereby the velocity and pressure of liquid emitted by the dispensing ducts are reduced, and excessive foaming and agitation of said liquid in the receptacle are prevented.

2. A faucet as specified by claim 1, one of the dispensing ducts being angular and composed of a relatively short portion communicating with the valve seat and aligned with the longitudinal duct of the draft arm, and a longer portion extending from the shorter portion into the outlet branch, the valve having a connecting duct adapted to connect the shorter duct portion with the longitudinal duct, there being an inner dispensing duct extending directly from the valve seat into the outlet branch.

3. A faucet as specified by claim 1, one of the dispensing ducts being angular and composed of a relatively short portion communicating with the valve seat and aligned with the longitudinal duct of the draft arm, and a longer portion extending from the shorter portion into the outlet branch, the valve having a connecting duct adapted to connect the shorter duct portion with the longitudinal duct, there being an inner dispensing duct extending directly from the valve seat into the outlet branch, the draft arm being provided with an extension of the shorter angular duct portion and with a closure separably engaged with said extension, the removal of said closure permitting the cleaning of the shorter portion of the angular duct, the longitudinal duct and the connecting duct of the valve.

4. A faucet as specified by claim 1, the dispensing ducts being shorter than the outlet branch, said branch being provided with an outer dispensing duct extension communicating with each of the said dispensing ducts, and extending to the outer end of said branch so that it is adapted to deliver a single compact stream to a receptacle, the conducting capacity of said duct extension being not less than the aggregate conducting capacity of said dispensing ducts.

THOMAS E. DAVIS.